United States Patent [19]

Lowe

[11] 3,773,522

[45] Nov. 20, 1973

[54] COMBINATION PIE CRUST AND PAN

[76] Inventor: James Franklin Lowe, Lock Box 2552, Prescott, Ariz. 86301

[22] Filed: Sept. 22, 1971

[21] Appl. No.: 182,682

[52] U.S. Cl. .............................. 426/132, 426/157
[51] Int. Cl. ...................... A21d 13/08, B65b 25/16
[58] Field of Search .............................. 99/92, 172

[56] References Cited
UNITED STATES PATENTS 2,668,767   2/1954   Lowe ...................................... 99/92

Primary Examiner—Raymond N. Jones
Attorney—Thomas D. Linton, Jr.

[57] ABSTRACT

This pie crust blank is of one piece and has a substantially circular bottom crust-forming portion surrounded by radially outwardly extending triangular top crust-forming portions integrally formed therewith. The junctures between the pairs of adjacent sides of the triangular portions and bottom crust portion have relief cutout means which coincide substantially with the edge of the side wall and rim of the pan in which the pie is to be baked. The triangular pieces are of a height from base to apex to permit the triangles to be folded over the filling material and meet at the center of the pie.

4 Claims, 5 Drawing Figures

Patented Nov. 20, 1973
3,773,522
2 Sheets-Sheet 1
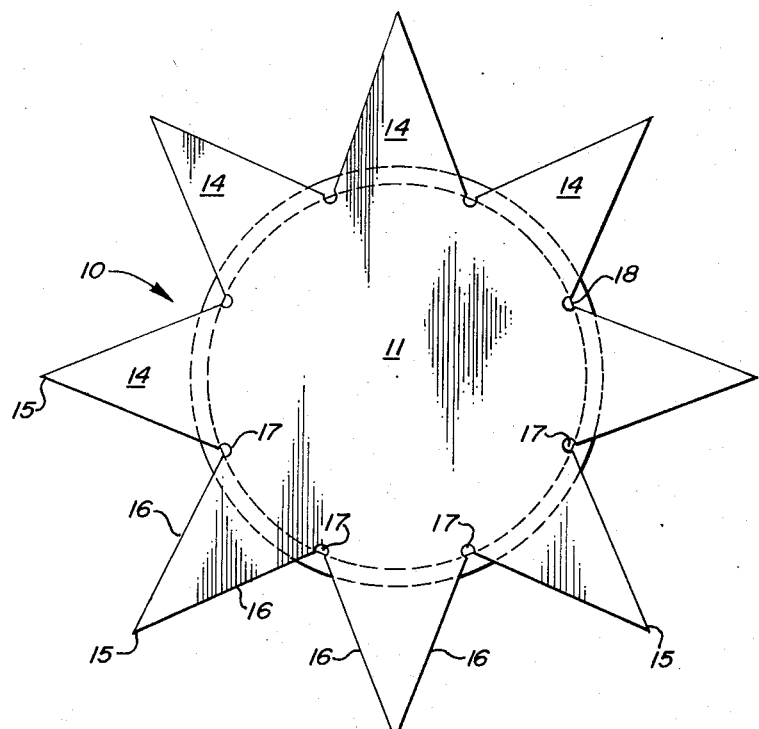
FIG. 1
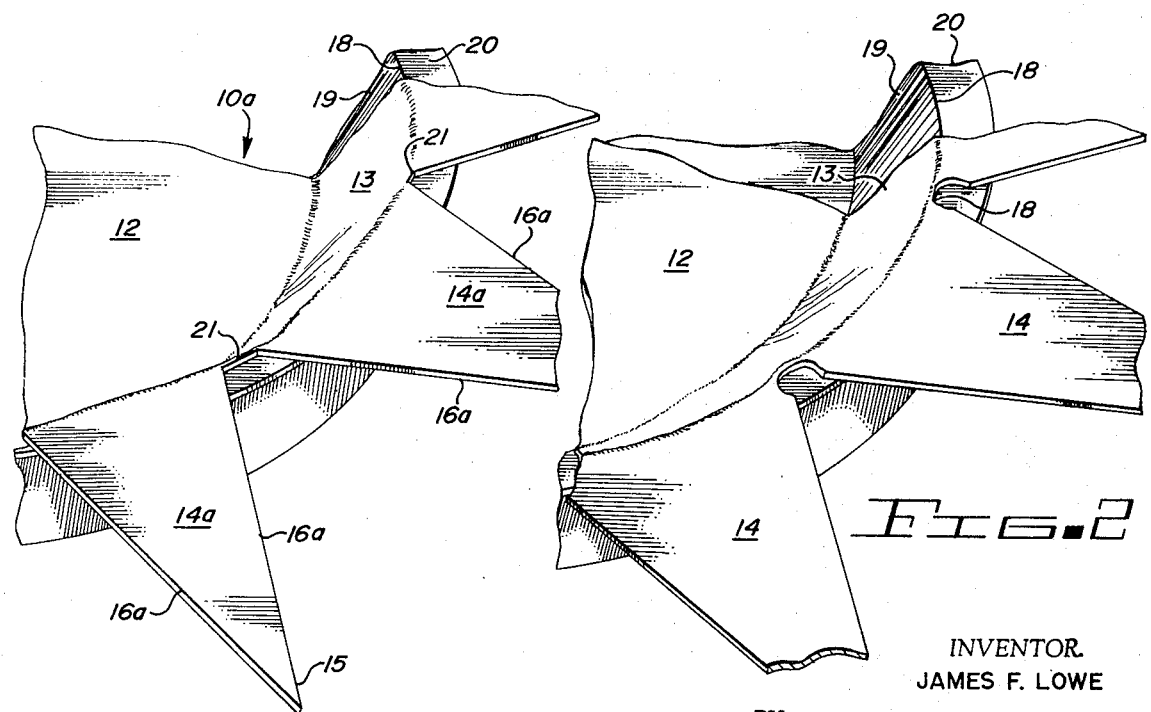
FIG. 3
FIG. 2
INVENTOR.
JAMES F. LOWE
BY
Thomas D. Linton Jr.
ATTORNEY

INVENTOR.
JAMES F. LOWE

BY
Thomas D Linton Jr.
ATTORNEY

COMBINATION PIE CRUST AND PAN

BACKGROUND

This invention is an improvement on the pie crust blank shown in my prior U.S. Pat. No. 2,668,767. The blank herein is similar in shape to the blank of the patent but is modified to eliminate certain objections such as scorching or burning at predetermined points and having portions where the crust is of double thickness after the pie is baked.

SUMMARY

This invention relates generally to the culinary art but is more particularly directed to the branch of that art known as pastry making. Still more particularly, the invention pertains to the practice of making one piece pie crust blanks of dough, placing the blanks in a pie pan and freezing the blank for storage and subsequent thawing, filling and baking.

An object of this invention is to improve the pie crust blank covered by the above-mentioned patent by slightly changing the size of the blank, changing the shape to include a feature which will permit the blank to be produced with limited waste, frozen in a folded state for storage, unfolded following a thawing stage to room temperature, filled and refolded for baking, the change in shape eliminating the formation of thin projections and overlapping portions which previously resulted in burned or otherwise unattractive edge portions which the user could not eat.

An object also is the formation of a pie crust blank with a body of generally round configuration having triangular radially extending projections at the periphery, the body being relieved at the points where the side edges of the projections connect therewith so that when the projections are folded over the body in a top crust forming position no undesired "dog-ear" or doubled over section will be formed; the pie, when baked, will be free of burned spots and thus completely edible.

A further object of the invention is to make the pie crust blank mentioned in the preceding paragraph with small circular or "tear drop" shaped cutouts at the juncture between adjacent side edges of the triangular projections and the body so that when the projections are folded over the filling no uneven protrusions will be formed and the finished product will present an attractive appearance.

A still further object of the invention is to make the bottom crust forming portion of the pie crust blank of such size relative to the pan in which it is to be baked that the cutouts or relieved areas will coincide with the juncture of the rim and side wall then when the triangular projections are folded over the filling none of the crust will rest on or overlie the rim of the pan where it might scorch or burn. No double thicknesses of the crust in the area of the pan rim will result, therefore, all of the pie may be consumed.

Other objects and advantages of the invention will be made apparent by the following descriptions of the forms of the invention selected for illustration in the accompanying drawings.

IN THE DRAWINGS

FIG. 1 is a plan view of a pie crust blank just after it has been cut in accordance with the present invention;

FIG. 2 is a perspective view of a fragmentary portion of the blank positioned in a pie pan and just prior to folding the triangular top crust forming portions over the bottom crust portion for freezing;

FIG. 3 is a similar view of a slightly modified form of blank;

DESCRIPTION

Figure 4:
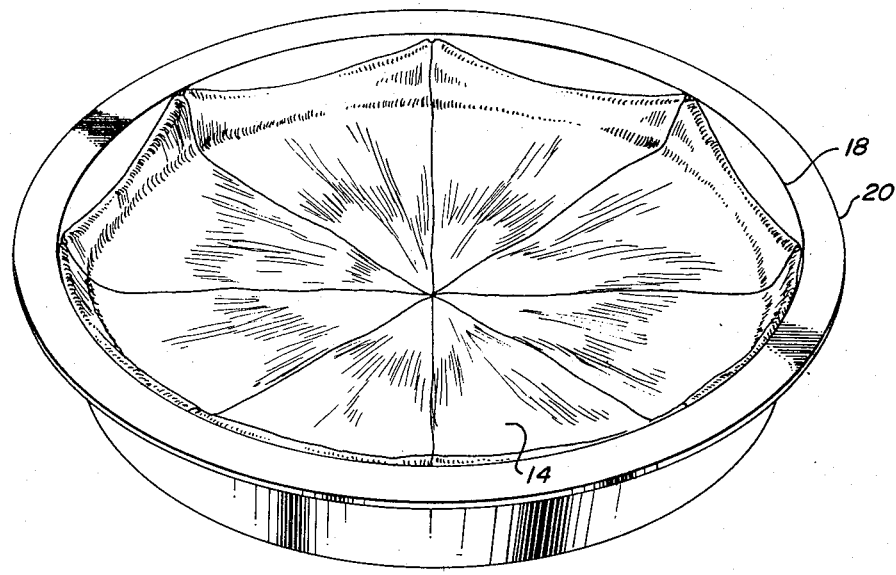
FIG. 4 is a perspective view of a frozen pie crust blank formed in accordance with the present invention set out to thaw preparatory to filling and baking.
Figure 5:
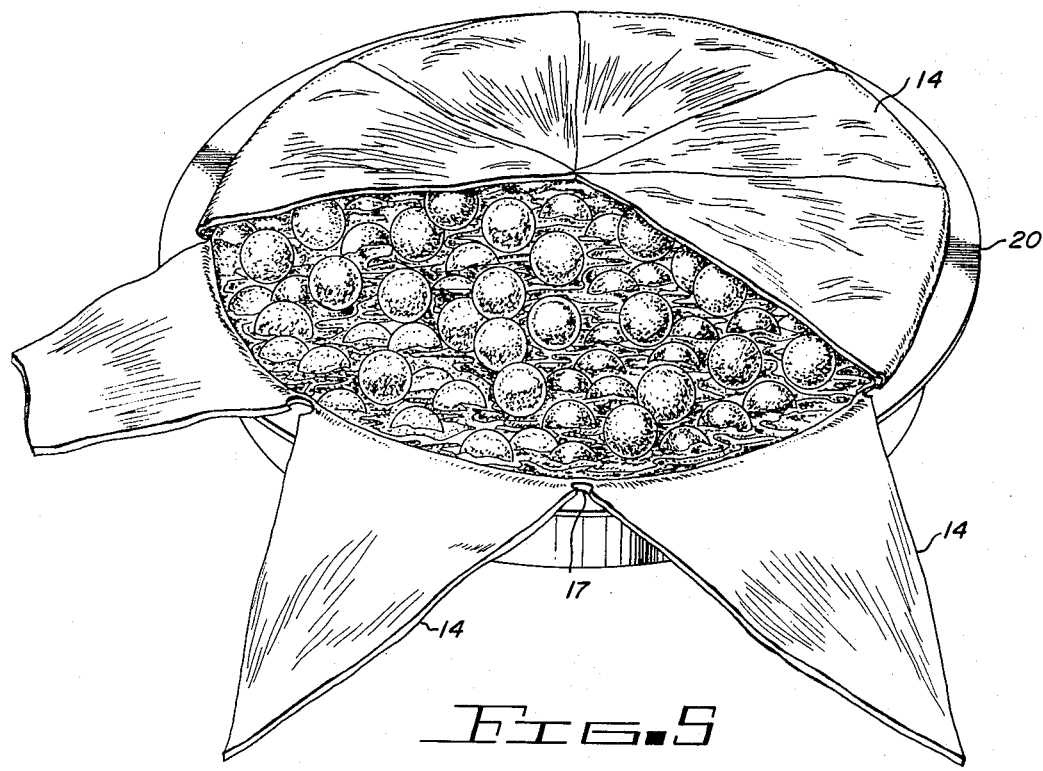
FIG. 5 is a similar view of a filled blank during the process of refolding the top crust forming projections over the filling for baking.

Referring more particularly to the drawing, the pie crust blank is designated generally by the numeral 10. This blank is cut from pie dough rolled flat to the desired thickness. It includes a substantially circular central portion 11 which forms the bottom 12 and side wall 13 of the finished pie shell.

To form the top crust of the finished pie, the blank is provided with a plurality, eight illustrated, of triangular projections 14 which are integral with the central portion 11 and extend radially therefrom. Each projection 11 has an apex 15 and a pair of side edges 16 extending from the apex to the central portion. The adjacent side walls of adjoining pairs of projections converge as they near the central portion and in the first form of the invention illustrated in FIGS. 1 and 2 connect with a substantially circular or "tear drop" cutout relief section 17. This relief facilitates the folding of the projections over the center section for subsequent freezing and storage. It also eliminates ragged or dog-ear stubs at the juncture of the side edges.

The diameter of the central portion is selected so that when the blank is placed in the pan in which it is to be baked the cutout sections 17 will coincide or overlie the juncture 18 between pan side wall 19 and the rim 20 as best illustrated in FIGS. 1 and 2. When the projections 14 are folded over the central portion 11 for freezing and/or baking, all the crust material will lie within the circle formed by the juncture 18. No part of the crust will rest upon the rim 20 and no double thickness portions will be present after the pie is filled and the projections folded over the filling to form the top crust.

In FIG. 3 the pie crust blank 10A is modified by substituting short straight edge section 21 for the circular or tear drop cutouts between the inner ends of the side edges 16A. In this form the straight edge sections 21 also substantially coincide with or lie just inside the juncture 18 between the pan side wall 19 and rim 20. The result will be the same, i.e., when the triangular top crust forming projections 14A are folded over the central portion all of the crust will lie inside of the circle formed by the inner edge of the pan rim. All dog-ears and overlapping or double layers of crust will be eliminated and a more attractive pie will result. Since the excess crust is eliminated and the pie is filled clear to the outer edge, each piece, when the pie is cut, will be full bodied and plump in appearance.

This method of formin pie crust blanks has a number of advantages, among which are: one cutting of the rolled dough becomes a double crust; since none of the crust rests on the pan rim, no scorching or burning at this location will occur when the pie is baked; a minimum number of steps are required to produce the finished pie; since there will be filling in every bite, all of the pie will be consumed by the portion and a minimum of waste will result. Also, during the preparation of the pie for baking, no perforation or crimping steps are required.

While the invention has been shown in its preferred form, many minor variations in the manner of securing the objectives may be made without departing from the spirit and scope of the invention as set forth in the accompanying claims.

I claim:

1. A combination pie crust dough blank and pie pan comprising:
   a. a pie pan having a circular bottom wall and an upwardly extending side wall at the periphery thereof, said pan being of a predetermined diameter at the upper edge of the side wall;
   b. a pie crust dough blank disposed in said pie pan, said blank having a substantially circular central portion of a diameter sufficient to cover the bottom and extend to the top of the side wall of the pan;
   c. a plurality of radially extending substantially triangular potential top crust forming projections radiating from, integral with and extending from said central portion;
   d. relief cutout portions located at points where the side edges of the projections connect to the circular portion and between adjacent sides of said triangular projections, said cutouts being of a size to facilitate folding of said projections and to eliminate ragged or dog-ear stubs at the juncture of the side edges, said cutout portions registering with the upper edge of the pan side wall, and said projections folded over and completely covering said side wall and central portion of said blank whereby the combination may be frozen and stored and said folded portions unfolded after thawing for insertion of a filling and refolded over the filling to completely cover the same prior to baking in such a manner that there is no double thickness of the crust in the area of the upper edge of the pan.

2. The combination pie crust dough blank and pan of claim 1 in which the relief cutout portions consist of substan-tially circular recesses.

3. The combination pie crust dough blank and pan of claim 1 in which the fold lines between the circular central portion and the triangular potential top crust forming portions substantially register with the upper edge of the side wall of the pie pan after the triangular potential top crust forming portions are folded over the filling.

4. The combination pie crust dough blank and pan of claim 1 in which the relief cutout portions between adjacent sides of the triangular potential top crust forming portions form short substantially straight edges coinciding with the upper edge of the pan side wall when the central portion of the blank is engaged with the bottom and side walls of the pan.

* * * * *